United States Patent [19]
Chen

[11] Patent Number: 6,043,870
[45] Date of Patent: Mar. 28, 2000

[54] COMPACT FIBER OPTIC ELECTRONIC LASER SPECKLE PATTERN INTERFEROMETER

[75] Inventor: Xiaolu Chen, Saline, Mich.

[73] Assignee: Cybernet Systems Corporation, Ann Arbor, Mich.

[21] Appl. No.: 08/886,316

[22] Filed: Jul. 1, 1997

Related U.S. Application Data

[60] Provisional application No. 60/020,984, Jul. 1, 1996.

[51] Int. Cl.$^7$ ........................................................ G01B 9/02
[52] U.S. Cl. .......................... 356/35.5; 356/347; 356/345
[58] Field of Search ................................... 356/35.5, 354, 356/345, 347, 357

[56] References Cited

U.S. PATENT DOCUMENTS

| | | | |
|---|---|---|---|
| 3,445,855 | 5/1969 | Grant | 346/1 |
| 3,545,259 | 12/1970 | Grant | 73/60 |
| 3,645,129 | 2/1972 | Grant | 73/67 |
| 4,125,314 | 11/1978 | Haskell et al. | 350/3.6 |
| 4,139,302 | 2/1979 | Hung et al. | 356/32 |
| 4,171,794 | 10/1979 | Haskell et al. | 251/50.1 |
| 4,392,745 | 7/1983 | Wright et al. | 356/348 |
| 4,425,039 | 1/1984 | Grant | 356/35.5 |
| 4,620,223 | 10/1986 | Haskell et al. | 358/107 |
| 4,650,302 | 3/1987 | Grant | 351/206 |
| 4,682,892 | 7/1987 | Chawla | 356/353 |
| 4,690,552 | 9/1987 | Grant et al. | 356/35.5 |
| 4,702,594 | 10/1987 | Grant | 356/35.5 |
| 4,832,494 | 5/1989 | Tyrer | 356/354 |
| 4,887,899 | 12/1989 | Hung | 356/35.5 |
| 5,007,738 | 4/1991 | Grant | 356/347 |
| 5,065,331 | 11/1991 | Vachon et al. | 364/508 |
| 5,082,366 | 1/1992 | Tyson, II et al. | 356/35.5 |
| 5,094,528 | 3/1992 | Tyson, II et al. | 356/35.5 |
| 5,121,148 | 6/1992 | Windeler et al. | 354/152 |
| 5,321,501 | 6/1994 | Swanson et al. | 356/345 |
| 5,481,356 | 1/1996 | Povet et al. | 356/35.5 |

OTHER PUBLICATIONS

Brown, G. C. and Pryputniewicz, R. J. (1993). Measurement of young's modulus on thin films under static and dynamic loading conditions. SPIE vol. 2004 Interferometry VI: Applications.

Chiang et al., "Laser Speckle Interferometry for Plate Bending Problems", Applied Optics, vol. 15, No. 9, pp. 2199–2204, Sep. 1976.

Chiang et al.,; "Stress Analysis of In–plane Vibration of 2–D Structure by a Laser Speckle Method", Applied Optics, vol. 19, No. 16, Aug. 15, 1980; pp. 2705–2708.

Chatters, T., Pouet, B. and Krishnaswamy, S. (1993). Non-destructive testing of adhesively bonded structures using synchronized pressure stressing. SPIE vol. 2001 Nondestructive Inspection of Aging Aircraft. pp 236–247.

Hung et al, "Image–Shearing Camera for Direct Measurement of Surface Strains", Applied Optics, vol. 18, No. 7, (Apr. 1, 1979) pp. 1046–1051.

(List continued on next page.)

Primary Examiner—Robert H. Kim
Attorney, Agent, or Firm—Gifford, Krass, Groh, Sprinkle, Anderson & Citkowski, PC

[57] ABSTRACT

Material defects and damage are detected and evaluated by stressing the material and looking for flaw-induced anomalies in a fringe pattern generated by the interference between two coherent laser beams and electronic image processing. In terms of apparatus, the system includes a sensor head and a head-mounted display (HMD) interfaced to a computer, power supply, and control electronics. In one embodiment, the sensor head contains a thermal stressing unit and an in-plane displacement sensitive ESPI arrangement which measures the in-plane displacement of the deformation induced by applying thermal stressing. In operation, a thermal stressing unit is integrated with the sensor head to provide a slight temperature difference between a localized region and surrounding areas, with the change in temperature being used to reveal the defects and damage through the interference between the two laser beams and electronic image processing.

8 Claims, 5 Drawing Sheets

OTHER PUBLICATIONS

Holownia, B. P. (1988). Examination of adhesive joints using electronic speckle pattern interferometry. Plastics and Rubber Processing and Applications 9, pp 203–208.

Chen, X. L. and Cloud, G. L. (1994). Nondestructive evaluation of composites using ESPI and gravity loading. Proc. 1994 SEM Spring Conference and Exhibits, Baltimore, Maryland, Jun., 1994.

Hariharan, "Speckle–Shearing Interferometry: A Simple System", Applied Optics, vol. 14, No. 11, (Nov. 1975) p. 2563.

Duffy, "Measurement of Surface Displacement Normal to the Line of Sight", Eaptl. Mech. pp. 378–384, Sep. 1974.

Höfling, R., Aswendt, P., Totzauer, W. and Jüptner, W. (1991). DSPI: A tool for analyzing thermal strain on ceramic and composite materials. SPIE vol. 1508, Industrial Applications of Holographic and Speckle Measuring Techniques, pp 135–142.

Hung et al, "Speckle–Shearing Interferometric Technique: a Full–Field Strain Gauge", in Applied Optics, vol. 14, No. 3, Mar., 1975, pp. 618–622.

Hung, "Shearography: A New Optical Method for Strain Measurement and Nondestructive Testing", Optical Engineering, May–Jun. 1982, pp. 391–395.

Conley, E. and Genin, J. (1990). Application of speckle metrology at a nuclear waste repository. SPIE vol. 1332, Optical Testing and Metrology III: Recent Advances in Industrial Optical Inspection, pp 798–801.

Koliopoulos, "Radial Grating Lateral Shear", Applied Optics, vol. 19, No. 9, pp. 1523–1528, May 1980.

Kwon, O.; "Infrared Lateral Shearing Interferometers", Applied Optics, vol. 19, No. 8 (Apr. 15, 1980) pp. 1225–1227.

Deaton, J.B. Jr. and Rogowski, R.S. (1993). Applications of electronic shearography for the inspection of airskin structures. SPIE vol. 2001 Nondestructive Inspection of Aging Aircraft. pp 224–235.

Lokberg, "Use of Chopped Laser Light in Electronic Speckle Pattern Interferometry", Applied Optics, vol. 18, No. 14, pp. 2377–2384, Jul. 1979.

Macovski, A., Ramsey, S. D. and Schaefer, L. F. (1971). Time–lapse interferometry and contouring using television system. Applied Optics, vol. 10, No. 12, pp 2722–2727.

Hung, Y. Y. and Taylor, C.E, "Measurement of Slopes of Structural Deflections by Speckle–Shearing Interferometry", in Experimental Mechanics, vol. 14, No. 7, pp. 281–285. Jul. 1974.

Maji, A. K. and Wang, J. (1992). Fracture mechanics of a tension–shear microcrack in rocks. Experimental Mechanics, pp 190–196, Jun.

Maji, A. K., Wang, J. L. and Lovato, L. (1991). Electronic Speckle Pattern Interferometry for fracture mechanics testing. Experimental Techniques, pp. 19–23.

Nokes, J., Cloud, G., Chen, X, and Wede, H. (1995). Interferometric Inspection of Composite Overwrapped Pressure Vessels. 1995 SEM Spring Conference, Grand Rapids, Michigan, Jun. 12–14.

Mallick et al, "Spatial Differentiation by a Lateral Shear Interferometer", Applied Optics, vol. 11, No. 2, (Feb. 1972), pp. 479–480.

Murty et al, "Liquid Crystal Wedge as a Polarizing Element and Its Use in Shearing Interferometry", Optical Engineering, vol. 19, No. 1, (Jan./Feb. 1980) pp. 113–115.

Preater, R. and Swain, R. (1993). A preliminary assessment of the requirements to transfer in–plane ESPI to an industrial spinning pit facility. SPIE vol. 2004 Interferometry VI: Applications. pp142–149.

Nakadate, S., Yatagai, T. and Saito, H., "Digital Speckle–Pattern Shearing Interferometry", Applied Optics, vol. 19, No. 24, Dec. 15, 1980, pp. 4241–4246.

Thinh et al., "Speckle Method for the Measurement of Helical Motion of a Rigid Body", Optica Acta, vol. 24, No. 12, pp. 1171–1178, Dec. 1977.

Ratnam, M. M., Evans, W. T. and Tyrer, J. R. (1992). Measurement of thermal expansion of a piston using holographic and electronic speckle pattern interferometry. Optical Engineering, vol. 31, No. 1, pp61–69.

Safai, M. (1992). Real–time shearography of silicone rubber bonds. Materials Evaluation, pp698–701, Jun.

Safai, M. (1993). Nondestructive evaluation of aircraft fuselage panels with electronic shearography. SPIE vol. 2066 Industrial Optical Sensing and Metrology, pp 20–25.

bull's-eye | butterfly | fringe discontinuites | abrupt fringe curvature changes | sudden fringe density changes

COMPACT FIBER OPTIC ELECTRONIC LASER SPECKLE PATTERN INTERFEROMETER

REFERENCE TO RELATED APPLICATION

This application claims priority of U.S. provisional application Serial No. 60/020,984, filed Jul. 1, 1996, the entire contents of which are incorporated herein by reference.

FIELD OF THE INVENTION

The present invention relates generally to material characterization and, in particular, to an electronic speckle-pattern interferometry (ESPI) system based upon an in-plane displacement sensitive optical configuration.

BACKGROUND OF THE INVENTION

The first electronic speckle-pattern interferometry (ESPI) systems were developed in the early 1970s. ESPI has since been applied to study many different problems, primarily in research laboratories. Moreover, most ESPI systems are out-of-plane displacement sensitive systems. Such applications include nondestructive inspection (NI), vibration analysis, materials characterization, electronic packaging study, biomechanics study, and verifications of the results from finite element analysis. ESPI has also been used to detect unbonded areas of adhesive joints, to study vibration in the automotive industry, to measure the thermal expansion of a piston, and to monitor strains and crack-propagation paths of rocks in fracture mechanics.

Young's modulus can be determined from FEM by using an iterative approach with the results from ESPI (both dynamic mode and static mode) and LDV. In-plane sensitive ESPI has been used for analyzing thermal strain on ceramic and composite materials, for conducting fracture mechanics testing, and for measuring the in-plane strain on high-speed rotating components.

The non-destructive testing/evaluation (NDI) methods most widely used in industry include ultrasonics, eddy-current measurement, and x-radiography. The ultrasonic techniques are used to detect flaws by measuring the response to an ultrasonic stress wave. However, due to the point-by-point or line-by-line scanning procedures involved, the ultrasonic method is typically slow. A medium, such as water or gel, is usually required to transfer the ultrasound energy from the transducer into the material, which is inconvenient in some cases.

X-radiography relies on the differential absorption or scattering of x-ray photons as they pass through a material. Flaws that either allow more x-ray photons to pass or that absorb or scatter the photons can be imaged if the effect is sufficiently pronounced. The molecules in many polymer composites are usually of low atomic weight nuclei, and hence the absorption of x-rays is low and contrast is usually poor, especially for a thin plate. Eddy-current measurement is only applicable to metallic materials. Furthermore, none of these methods relate flaw detection to the stress/strain states of a test object in any fundamental way. Therefore, how a detected flaw affects the performance of a particular component cannot be revealed by current detection processes.

Ultrasonic and x-ray technologies are good at determining the geometry and detailed location of the flaws, especially the internal flaws in a structure. Unfortunately, neither of these methods relate the detection to the effect of the flaws on the material or strength. Furthermore, for inspection of a large area, these techniques are slow and costly. Although ESPI is most sensitive to surface and subsurface flaws, internal flaws can also be detected from their induced "disturbances" on the surface when an appropriate stressing technique is used.

Among all NDI techniques discussed, laser interferometry, including holographic interferometry, ESPI, and shearography are the only tools which can detect flaws through direct measurement of a material's strength-related parameters such as deformation/displacement or strain. These techniques offer the opportunity for directly assessing the actual effects of the detected damage on the structures. Laser interferometry techniques are highly sensitive to a wide variety of flaws and can inspect a large area at fast speed.

In contrast to traditional methods, loading (stressing) is an essential part of NDI processes based upon ESPI. The loading provides an important connection between the detected flaws and the effect of the flaws on the integrity and strength of the structures under test. However, ESPI systems based on in-plane displacement sensitive optical configurations have not been utilized to the same extent as out-of-plane-displacement sensitive configurations. One reason is that the in-plane systems are bulky and difficult to align. There remains an outstanding need, therefore for a lightweight and/or portable ESPI system based upon an in-plane displacement sensitive optical configuration.

SUMMARY OF THE INVENTION

The present invention addresses deficiencies in the prior art by providing an electronic speckle-pattern interferometry (ESPI) system based upon an in-plane displacement sensitive optical configuration. In addition to laboratory environments, the system is useful as a portable device in real-world field applications. Since the field-of-view of the optics involved can be made rather large, the invention provides a tool for large-area nondestructive inspection and evaluation of materials and structures and, in particular, may be used in the characterization of very large vehicles and vessels such as aircraft.

In terms of apparatus, the system includes a sensor head and a display device interfaced to a computer, power supply, and control electronics. In one embodiment, the sensor head contains a thermal stressing unit and an in-plane displacement sensitive ESPI arrangement which measures the in-plane displacement of the deformation induced by applying thermal stressing. Material defects and damage may then be detected and evaluated by stressing the material and looking for flaw-induced anomalies in a fringe pattern generated by the interference between two coherent laser beams and electronic image processing.

DETAILED DESCRIPTION OF THE INVENTION

Figure 1:
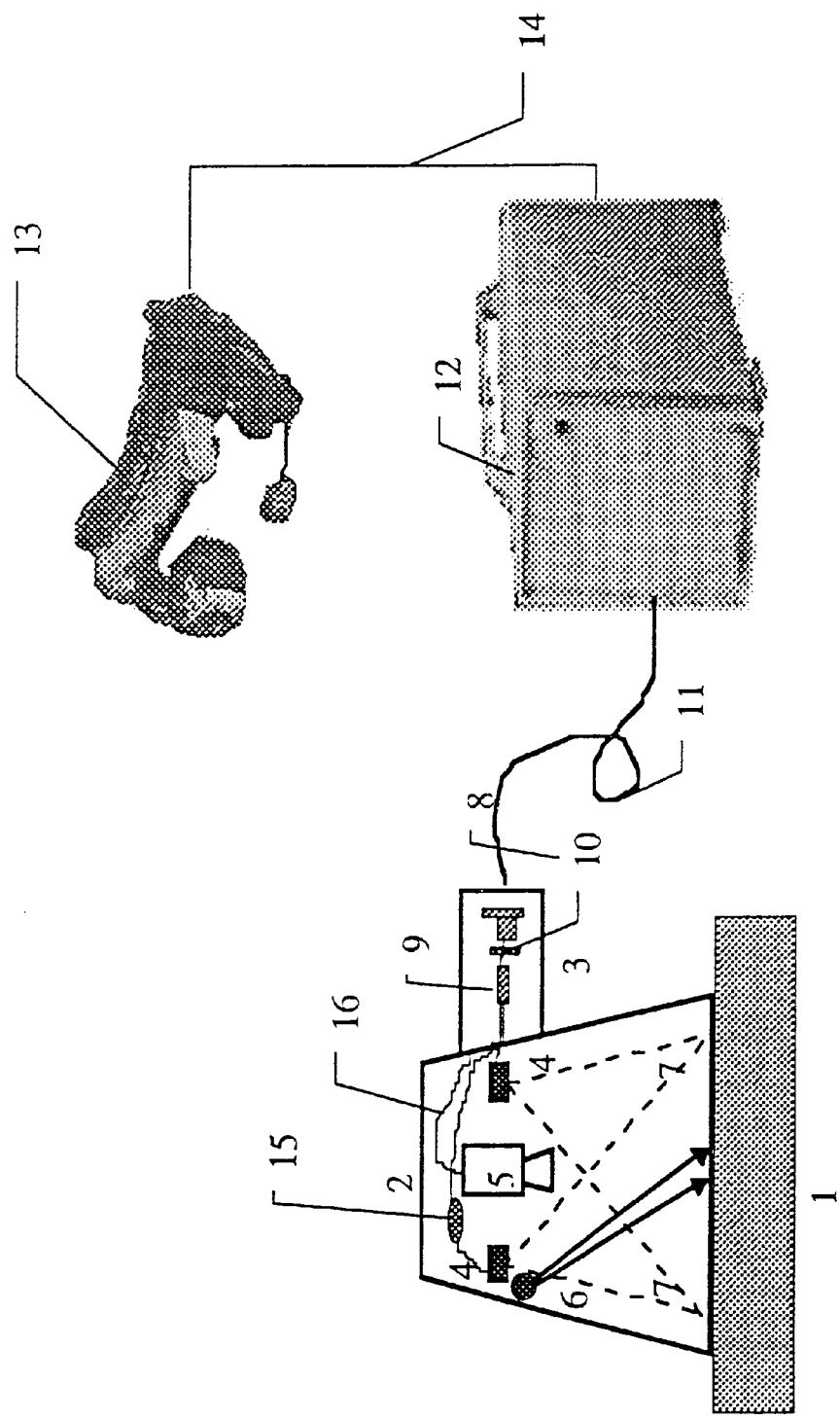
FIG. 1 is an overall view of apparatus according to the invention.

As shown in FIG. 1, a system according to the invention includes a sensor head, a head-mounted display (HMD), and an electronic subsystem which contains a computer, a frame grabber, power supply, and control electronics. The sensor head contains an integrated thermal stressing unit and an in-plane ESPI optics which measures the in-plane displacement component of the deformation. Since the field-of-view of the optics can be made rather large, this invention provides a tool for large-area nondestructive inspection and evaluation of materials and structures and, in particular, may be used in the characterization of very large vehicles and vessels such as aircraft.

The thermal stressing unit is used to provide a slight temperature difference between a localized region and its surrounding areas on the object being inspected. The temperature change creates a strain field in the material. Flaws in the material are detected by observing flaw-induced anomalies in the fringe pattern.

The fringe pattern is generated by the interference between two symmetrical coherent laser beams and electronic image processing. The sensor head is designed to be hand-held, and the results are displayed on a miniature monitor inside a lightweight, head-mounted display (HMD) device. The compact electronic enclosure includes a microcomputer control and image processing, a power supply, a frame grabber for image acquisition, and a piezo-electric transducer (PZT) controller for implementing phase-stepping for quantitative fringe analysis.

Figure 2:
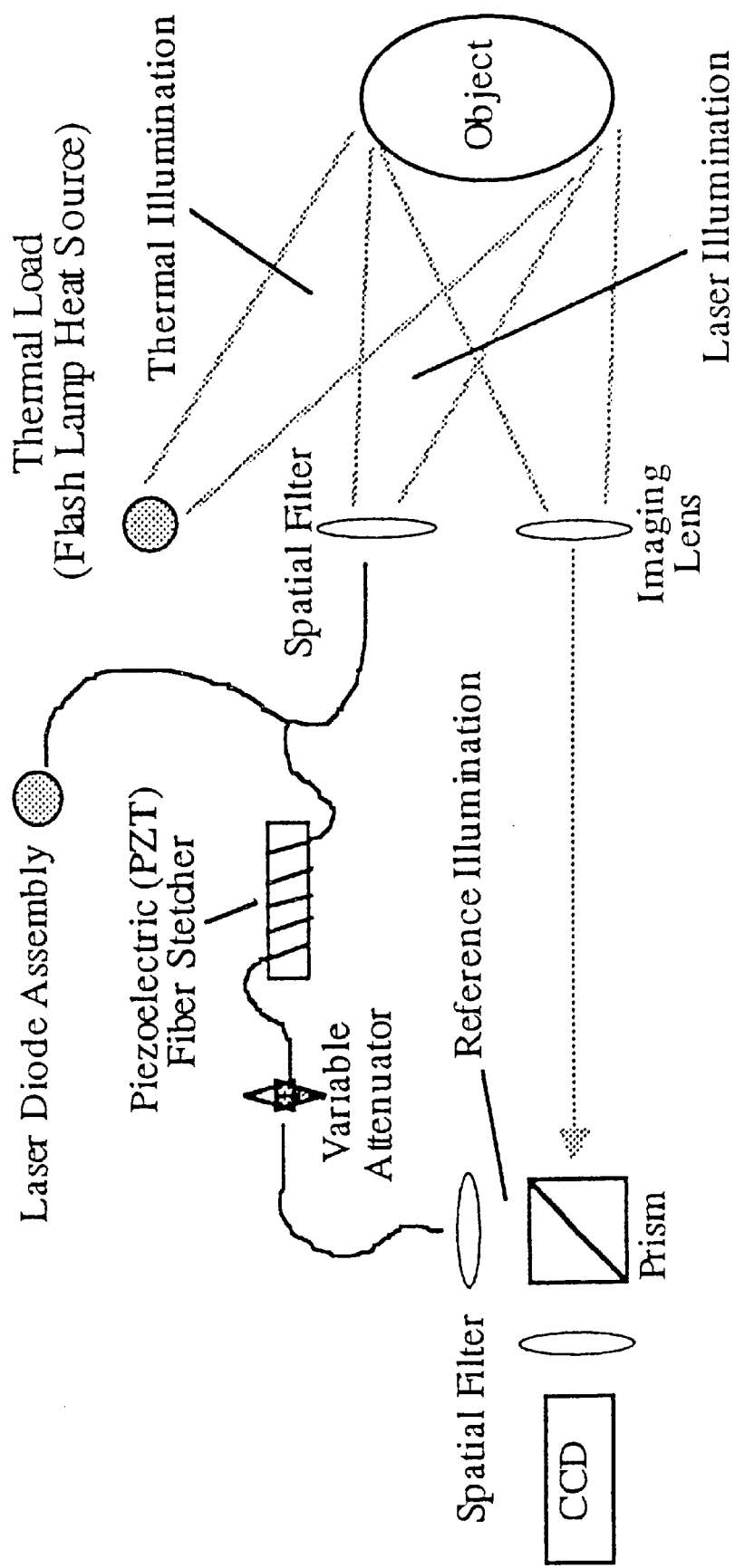
FIG. 2 is a schematic diagram including ESPI optics mounted inside a sensor head.

The overall system design is shown in FIG. 1 and is diagramed in FIG. 2. Item 1 is the object being inspected, and item 2 is an enclosure which forms the sensor head. The enclosure protects the sensor optics from environmental disturbances which include excessive lighting, air turbulence, and dust particles. Item 3 represents a handle with control buttons for hand-held operation.

Item 4 illustrates fiber ends which are located symmetrically about the, optical axis of the CCD imaging lens. These fiber ends provide two coherent laser waves for interference on the surface of the object being inspected. Since the intersecting angles between the optical rays from the two waves are different at each point across the field-of-view (FOV), the resulting sensitivity vector is not a constant but may be corrected through software. Item 5 represents a CCD camera with digital shutter control and aperture adjustment. Item 6 is an integrated heating unit which can provide a localized temperature increase in the FOV. The heating unit is controlled by buttons on the handle.

Item 7 represents the two illuminating laser waves. Item 8 is a diode laser, and item 9 is a directional coupler used to split the laser energy into a 50:50 ratio. Coupling optics 10 are used for launching the laser energy into the fiber, with cable connection 11 being used between the electronic enclosure 12 and the sensor head 2. The electronic enclosure 12 contains a microcomputer, a frame grabber, power supplies, and the PZT fiber stretcher control. A head-mounted display unit 13 is for viewing the results. A cable connection 14 is used between the electronic enclosure 120 and the HMD. A PZT fiber stretcher 15 implements a phase-stepping technique for quantitative fringe analysis, and item 16 is the single-mode optical fiber.

In ESPI, the interferometric fringes formed are a measure of the amount of surface deformation between two different states of an object under test. The comparison may be between two deformed (stressed) states, or between a deformed state and an undeformed or unstressed state. The method of stressing the object is critical, because the sensitivity of different types of flaws to different loading or stressing methods is different.

The reaction to stressing is a function of physical and material properties with respect to the loading method. Normally, the fringes, or deformation contours, on the test object are continuous and smooth. But in the regions of flaws or damage, the response of the surface to the stress is often different, and the flaws and damage disturb the strain field, causing anomalies in the fringe pattern. Although ESPI normally detects the surface and subsurface flaws, these flaws are believed to be the most responsible for early fatigue failures. The flaws and damage which affect the structure the most may be detected by employing the loading type which simulates the working condition of the product. These defects may be cracks, voids, debondings, impact damage, inhomogeneous material properties, delaminations, fiber breakage, matrix cracking and so on.

Figure 3:
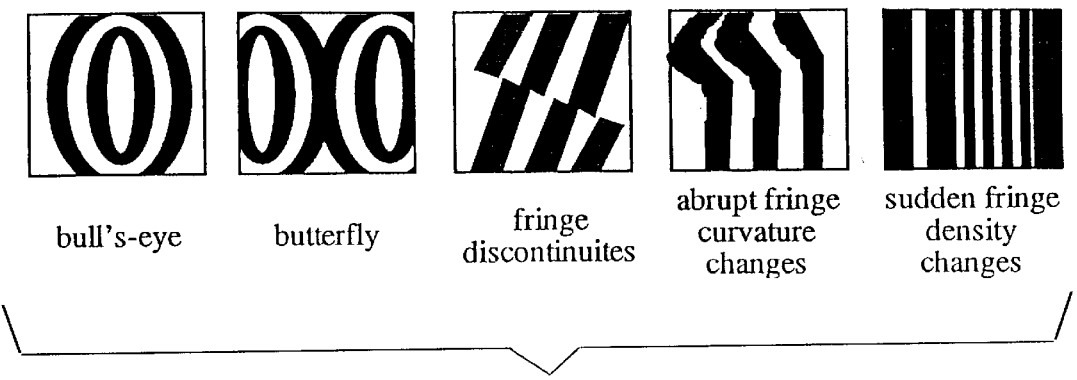
FIG. 3 shows a typical defect presentation.
Figure 4:
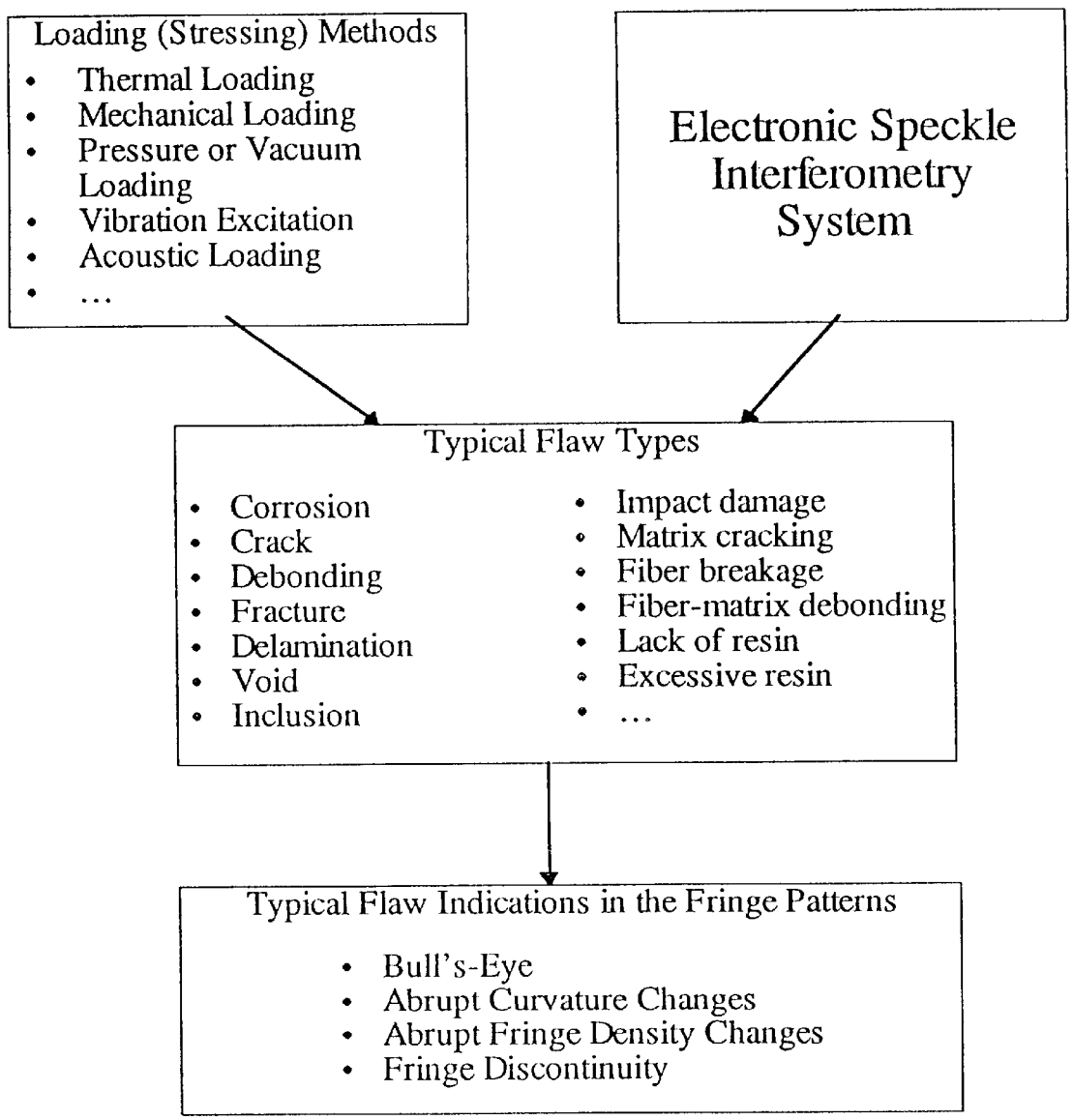
FIG. 4 is a flowchart of damage and flaw detection types.

Such flaws or damage are normally manifest in the fringe pattern as fringe anomalies such as "bull's-eye," "butterflies," fringe discontinuities, abrupt fringe curvature changes, or sudden fringe density changes, as shown in FIG. 3. Loading techniques should therefore be designed so that flaws and damage can be revealed as distinctly as possible, and so that the ideal loading may be the one which simulates the actual working condition of the component. Automatic pattern recognition methods combined with a knowledge-based approach can be used for the detection and classification of anomalous fringe patterns. The principle of damage and flaw detection is outlined in the flow chart of FIG. 4.

The key to successful NDE using ESPI is to select an effective stressing technique that will reveal defects by inducing localized surface deformation. Although the system described herein employs a thermal stressing unit, the object under test can also be slightly or mildly stressed in other ways, including mechanical stressing, thermal excitation, pressurization, vacuum, and acoustic or mechanical vibration. The method employed would depend upon the object itself, the type of defect to be detected, and the accessibility of the object.

For each loading method, there are a number of ways to carry it out. Thermal stressing is convenient for loading over large surface areas without access to anything other than the front surface face, where the surface is thermally illuminated. For pressure vessels, internal pressurization is a suitable loading method. For plates or some part types, compression or pulling can be utilized. For plates or beams, bending may be a suitable loading method.

Referring to the ESPI setup shown in FIG. 2, the thermal load illuminates the object surface to create a build-up of heat. Under heating, the surface expands and loads or pressurizes the surface material. In the presence of an internal defect, the surface material is weakened, and will buckle in or buckle out a small amount. This causes changes in surface tangent angle and displacement, which can be measured using laser interferometric means, namely electronic speckle interferometry.

In a preferred embodiment a diode assembly, including a coherent laser diode and focusing/beam forming optics, begins the defect imaging process by projecting coherent light into the fiber coupling. The fiber divides the light into the portion going to the object surface for imaged and a reference beam. The surface is imaged into a combiner (referred to in the figure as a prism) which adds the reference beam (after computer controlled phase shifting and attenuation) to the image. This causes an interference image to be formed which is imaged by the charge-coupled-device (CCD) camera. The variable attenuator is used to compensate for signal lost in transit from the illumination to object, and through reflection back to the imaging lens. The PZT stretcher is used to control phase shifting so that multiple interference images can be acquired for automated conversion into displacement maps (see below).

The imaging system can be operated in at least two modes. In a fast mode, a phase-stepping technique, controlled by the PZT fiber stretcher, is not activated, which allows an operator to rapidly perform large-area inspection (s). In this mode, real-time electronic image subtraction and image enhancement are performed to generate fringe patterns to reveal flaws in the form of small surface displacements. Also in this mode, flaws show up as irregularities in the smooth fringe pattern. These irregularities are typical of specific flaw types, so that the operator can classify probable flaws by viewing them directly. However, it may be difficult to convert the flaw images into quantitative display measurements in this mode. Phase deconvolution methods may also be used to convert from fringe pattern to phase displacements to actual displacements.

In a slower operational mode, a phase-stepping technique is activated. The operator can zoom into the localized region containing flaws, and conduct a detailed quantitative evaluation of the flaws. In this mode, a set of images will be produced using a phase-stepping technique and computed to generate quantitative map of the derivative of the displacement.

The phase stepping is implemented by stretching the fiber which carries the reference signal very small amounts using the PZT actuator. With three shifted images, it is possible to compute phase displacement and then actual surface displacement directly in closed form. Then, with an appropriate phase unwrapping algorithm, displacements can be found and these results can be stored in a database and retrieved for later use in quantitative defect assessment.

Figure 5:
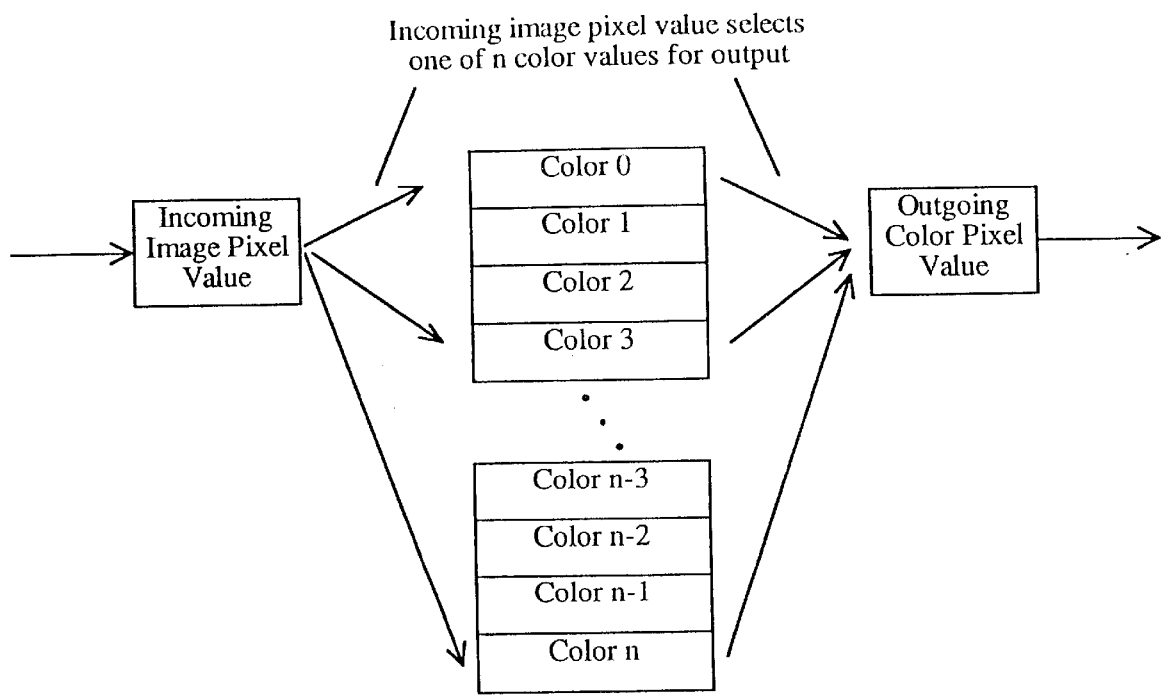
FIG. 5 is a color mapping used for display purposes.

After defect/clear image formation, the image is presented to an operator or automated system for assessment. When presented to an operator, typically four image forms are available. The first is the direct view of the surface (i.e., without any fringe processing). This view can help an operator register other views to features on the surface under normal viewing conditions. This view also allows for the detection of defects at the object surface (no visibility inside the surface is possible). This "plain view" can be enhanced through edge detection, which enhances small defects, and can be used as an overlay to a normal image with color coded edge strength. That is, the image can be spatially differentiated and mapped into a color code through a pallet of colors associated with edge strength level. FIG. 5 shows this process of mapping a signal scale into a color map for improved operator perception.

The next image available is the fringe image formed by the electronic shearography sensor, which shows laser interference patterns. These patterns can be smoothed and also mapped through a color look-up pallet to enhance operator perception of the fringe patterns.

Also in the slow mode, three or more fringe images, which are phase shifted (via the PZT stretcher) by known amounts from each other, can be used to compute phase-map images which look effectively like the fringe images, but represent known displacements. By phase unwrapping and scaling these phase images, true displacement images can be computed. Again the phase map image and the true display images can be color coded to enhance operator perception of defects.

Figure 6:
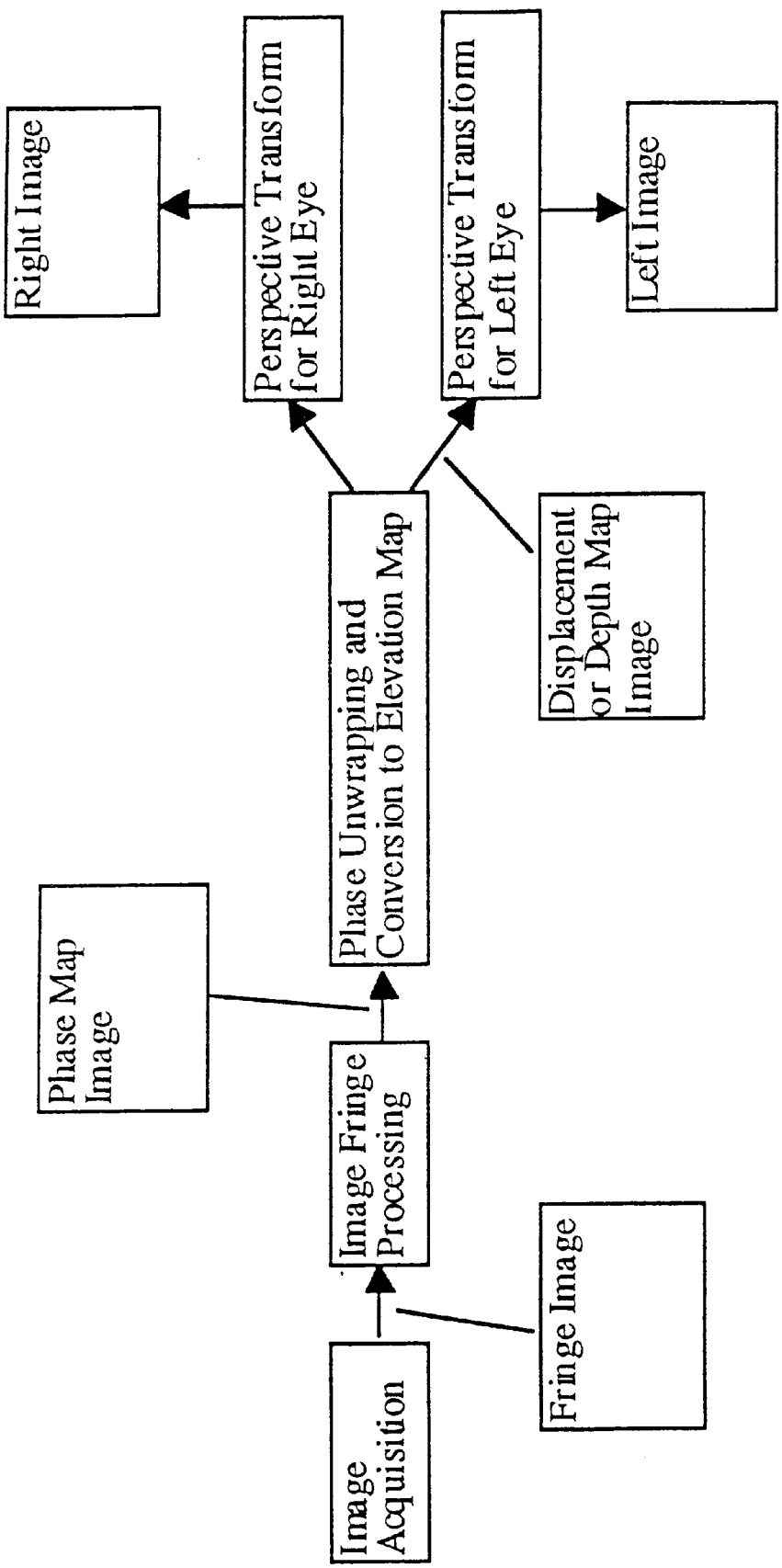
FIG. 6 illustrates three-dimensional view generation according to the invention.

All of these images can either be displayed on a conventional display device such as a CRT or flat panel, but can also be directly present to the operator through an HMD, such as a helmet or head-mounted display. This may be particularly interesting in the case of true displacement images, because they represent a true three-dimensional representation, and can thus be transformed into alternative perspective views through 3D computer graphics. This allows the operator to be presented with two alternative images, one for the right eye and one for the left eye, thus generating a three-dimensional perception of a microscopic defect for the benefit of an operator, as shown in FIG. 6.

That which is claimed is:

1. An electronic speckle-pattern interferometry system based upon an in-plane displacement sensitive optical configuration, comprising:

a thermal stressing unit operative to provide a slight temperature differential between a localized region and a surrounding area of an object under inspection;

a source of coherent optical radiation directed toward the object;

an optical fiber configured to receive radiation from the source, including a fiber stretcher to implement a phase-stepping technique for quantitative fringe analysis;

means for receiving and combining an image of the object with the output of the fiber stretcher so as to generate a fringe pattern characteristic of flaw-induced anomalies; and a display device upon which to view the fringe pattern.

2. The system of claim 1, wherein the display device forms part of a head-mounted display.

3. The system of claim 2, further including a programmed controller interfaced to the head-mounted display to generate a three-dimensional view of the fringe pattern.

4. The system of claim 3, wherein the controller is operative to perform the following functions:

a) convert the fringe pattern into a phase-map image;

b) unwrap the phase of the phase-map image to generate an elevation map; and c) present right and left perspective transforms to the right and left eyes of a viewer through the head-mounted display.

5. A method of performing electronic speckle-pattern interferometry using an in-plane displacement sensitive optical configuration, comprising the steps of:

thermally stressing a localized region of an object under inspection;

directing a source of coherent optical radiation directed toward the object;

receiving radiation from the source through a fiber stretcher to implement a phase-stepping technique for quantitative fringe analysis;

receiving and combining an image of the object with the output of the fiber stretcher so as to generate a fringe pattern characteristic of flaw-induced anomalies; and displaying the fringe pattern.

6. The method of claim 5, wherein the step of displaying the fringe pattern includes viewing the fringe pattern through a head-mounted display.

7. The method of claim 5, further including the step of generating a three-dimensional display of the fringe pattern.

8. The system of claim 7, further including the steps of:

a) converting the fringe pattern into a phase-map image;

b) unwrapping the phase of the phase-map image to generate an elevation map; and c) presenting right and left perspective transforms to the right and left eyes of a viewer through the head-mounted display.

* * * * *